(12) United States Patent
Bhardwaj et al.

(10) Patent No.: US 10,614,136 B2
(45) Date of Patent: Apr. 7, 2020

(54) METHOD AND SYSTEM FOR MANAGING PRIMARY FIELD-SPECIFIC ENTITY RECORDS REQUIRED BY USER

(71) Applicant: Innoplexus AG, Eschborn (DE)

(72) Inventors: Gunjan Bhardwaj, Taunus (DE); Gaurav Tripathi, Pune (IN); Vatsal Agarwal, Rampur (IN); Elfin Garg, New Delhi (IN)

(73) Assignee: Innoplexus AG, Eschborn (DE)

( * ) Notice: Subject to any disclaimer, the term of this patent is extended or adjusted under 35 U.S.C. 154(b) by 299 days.

(21) Appl. No.: 15/855,581

(22) Filed: Dec. 27, 2017

(65) Prior Publication Data

US 2018/0253494 A1  Sep. 6, 2018

Related U.S. Application Data

(60) Provisional application No. 62/466,360, filed on Mar. 2, 2017.

(51) Int. Cl.
*G06F 16/00* (2019.01)
*G06F 16/951* (2019.01)
*G06F 7/02* (2006.01)
*G06Q 10/06* (2012.01)

(52) U.S. Cl.
CPC ............ *G06F 16/951* (2019.01); *G06F 7/026* (2013.01); *G06Q 10/0631* (2013.01)

(58) Field of Classification Search
CPC .. G06F 16/35; G06F 16/248; G06F 16/24578; G06F 16/288; G06F 17/278; G06F 16/285; G06F 16/3332; G06F 16/13
See application file for complete search history.

(56) References Cited

U.S. PATENT DOCUMENTS

| 8,266,168 B2 * | 9/2012 | Bayliss | G06F 16/285 |
| | | | 707/758 |
| 8,484,211 B2 * | 7/2013 | Bayliss | G06F 16/24578 |
| | | | 707/736 |
| 8,495,077 B2 * | 7/2013 | Bayliss | G06F 16/285 |
| | | | 707/758 |

(Continued)

FOREIGN PATENT DOCUMENTS

EP  3370193 A1 *  9/2018  ............. G06F 7/026

*Primary Examiner* — Cheryl Lewis
(74) *Attorney, Agent, or Firm* — Ziegler IP Law Group, LLC (57) ABSTRACT

A method and a system for managing primary field-specific entity records required by a user. The method includes developing a structured database to identify field-specific entity records, identifying pairs of field-specific entity records having similar entity attribute in the field segments, designating relations between the identified pairs of field-specific entity records, determining a weightage score of the relations between the pairs of field-specific entity records, determining an importance score of each of the field-specific entity records based on the plurality of entity attributes of the field-specific entity record and relations of the field-specific entity record, receiving a first user-input based on a field specified by the user, identifying the primary field-specific entity records based on the determined weightage scores and the determined importance scores of the field-specific entity records in the field segment associated with the specified field.

11 Claims, 2 Drawing Sheets

(56) References Cited

U.S. PATENT DOCUMENTS

| | | | | |
|---|---|---|---|---|
| 8,510,323 B2* | 8/2013 | Eshwar | ............... | G06F 16/2465 |
| | | | | 707/765 |
| 8,965,914 B2* | 2/2015 | Eshwar | ............... | G06F 16/2465 |
| | | | | 707/765 |
| 9,058,380 B2* | 6/2015 | Lesiecki | ............. | G06F 16/2468 |
| 2010/0205318 A1* | 8/2010 | Melnyk | .............. | H04N 21/2402 |
| | | | | 709/231 |

* cited by examiner

METHOD AND SYSTEM FOR MANAGING PRIMARY FIELD-SPECIFIC ENTITY RECORDS REQUIRED BY USER

CROSS REFERENCE TO RELATED APPLICATIONS

This application claims priority to U.S. Provisional Patent Application No. 62/466,360, filed Mar. 2, 2017, which is hereby incorporated by reference in its entirety.

TECHNICAL FIELD

The present disclosure relates generally to identifying influential entities; and more specifically to methods and systems for managing primary field-specific entity records. Moreover, the present disclosure also relates to computer readable medium containing program instructions for execution on a computer system, which when executed by a computer, cause the computer to perform method steps for managing primary field-specific entity records required by a user.

BACKGROUND

Generally, with advancement in technology, there has been a gradual increase in terms of development of new services. For example, such services may include launch or development of a new product, research work and so forth. Furthermore, guidance is required for the development of product and successful launch of any product or service. Moreover, such guidance may be provided by entities that may hold an experience and influence over such developments and launches. Furthermore, primary entities in a certain field may include top influential leaders, companies and so forth of such field. Moreover, the primary entities may relate to a specific field of interest based on the industry requirements. For example, a pharmaceutical company requires different health care professionals at different stages of drug life cycle for different drugs. Similarly, a telecom firm may require different types of professionals at various stages in the life of any product for marketing.

Conventionally, the primary entities may be identified using surveys, literature searches, nominations and so forth. Furthermore, the data for such analysis may be acquired from publically available data sources such as social networking sites, blogs, news, institutes, profiles, literature database and so forth. Moreover, the data for such analysis is required to be maintained manually. Furthermore, the data may be arranged as an entity record. Furthermore, the entity records may include entity names and entity attributes (such as, information) associated with the entity names. Moreover, the entity attributes may be associated with each other in a way to provide additional information related to the specific field of interest. However, the entity records may not be updated regularly. Therefore, it may be difficult to identify changes in associations between the entities based on the available information in the entity records.

Generally, the launch of the new service or product in the market is time-critical. Furthermore, the marketing budgets are usually limited. Therefore, manually maintained entity records may become a disadvantage for the identification of the primary entity. Furthermore, such analysis can be biased or based on limited selection of entity records from the available data. Moreover, a software may be developed for such analysis. Furthermore, such software may consider a broad set of criteria for the identification of the primary entities while neglecting the complex associations of different entity records. Therefore, the method of identifying primary entities related to the specific field of interest is quiet difficult in the existing scenario.

Therefore, in light of the foregoing discussion, there exists a need to overcome the aforementioned drawbacks associated with the method of identifying the field specific primary entities.

SUMMARY

The present disclosure seeks to provide a method for managing primary field-specific entity records required by a user. The present disclosure also seeks to provide a system for managing the primary field-specific entity records required by the user. The present disclosure seeks to provide a solution to the existing problem of biased and difficult identification of influential entities. An aim of the present disclosure is to provide a solution that overcomes at least partially the problems encountered in prior art, and provides simple, optimal and reliable solution for identifying influential entities in specific fields.

In one aspect, an embodiment of the present disclosure provides a method for managing primary field-specific entity records required by a user, wherein the method comprises:
providing a structured database having field-specific entity records, wherein the field specific entity records are obtained by segmenting entity records in one or more field segments, and each of the entity records comprises an entity name and plurality of entity attributes;
identifying at least one pair of field-specific entity records having at least one similar entity attribute in each of the one or more field segments;
designating relations between the identified at least one pair of field-specific entity records;
determining a weightage score of each of the relations between the at least one pair of field-specific entity records;
determining an importance score of each of the field-specific entity records based on the plurality of entity attributes of the field-specific entity record and relations of the field-specific entity record;
receiving a first user-input based on a field specified by the user, wherein the primary field-specific entity records required by the user are identified from a field segment associated with the specified field; and
identifying the primary field-specific entity records based on the determined weightage scores and the determined importance scores of the field-specific entity records in the field segment associated with the specified field.

In another aspect, an embodiment of the present disclosure provides a system for managing primary field-specific entity records required by a user, wherein the system comprises:
a database arrangement operable to store a structured database;
a communication module operable to retrieve existing data sources from the database arrangement, wherein the communication module is operatively coupled to a processing module; and
the processing module operable to:
receive the structured database having field-specific entity records, wherein the field specific entity records are obtained by segmenting entity records in one or more field segments, and each of the entity records comprises an entity name and plurality of entity attributes;

identify at least one pair of field-specific entity records having at least one similar entity attribute in each of the one or more field segments;

designate relations between the identified at least one pair of field-specific entity records;

determine a weightage score of each of the relations between the at least one pair of field-specific entity records;

determine an importance score of each of the field-specific entity records based on the plurality of entity attributes of the field-specific entity record and relations of the field-specific entity record;

receive a first user-input based on a field specified by the user, wherein the primary field-specific entity records required by the user are identified from a field segment associated with the specified field; and identify the primary field-specific entity records based on the determined weightage scores and the determined importance scores of the field-specific entity records in the field segment associated with the specified field.

In yet another aspect, an embodiment of the present disclosure provides a computer readable medium containing program instructions for execution on a computer system, which when executed by a computer, cause the computer to perform method steps for g managing primary field-specific entity records required by a user, the method comprising the steps of:

providing a structured database having field-specific entity records, wherein the field specific entity records are obtained by segmenting entity records in one or more field segments, and each of the entity records comprises an entity name and plurality of entity attributes;

identifying at least one pair of field-specific entity records having at least one similar entity attribute in each of the one or more field segments;

designating relations between the identified at least one pair of field-specific entity records;

determining a weightage score of each of the relations between the at least one pair of field-specific entity records;

determining an importance score of each of the field-specific entity records based on the plurality of entity attributes of the field-specific entity record and relations of the field-specific entity record;

receiving a first user-input based on a field specified by the user, wherein the primary field-specific entity records required by the user are identified from a field segment associated with the specified field; and identifying the primary field-specific entity records based on the determined weightage scores and the determined importance scores of the field-specific entity records in the field segment associated with the specified field.

Embodiments of the present disclosure substantially eliminate or at least partially address the aforementioned problems in the prior art, and enables simple and optimal method for identifying influential entities in specific fields.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for managing primary field-specific entity records required by a user, wherein the method comprises:

providing a structured database having field-specific entity records, wherein the field specific entity records are obtained by segmenting entity records in one or more field segments, and each of the entity records comprises an entity name and plurality of entity attributes;

identifying at least one pair of field-specific entity records having at least one similar entity attribute in each of the one or more field segments;

designating relations between the identified at least one pair of field-specific entity records;

determining a weightage score of each of the relations between the at least one pair of field-specific entity records;

determining an importance score of each of the field-specific entity records based on the plurality of entity attributes of the field-specific entity record and relations of the field-specific entity record;

receiving a first user-input based on a field specified by the user, wherein the primary field-specific entity records required by the user are identified from a field segment associated with the specified field; and identifying the primary field-specific entity records based on the determined weightage scores and the determined importance scores of the field-specific entity records in the field segment associated with the specified field.

In another aspect, an embodiment of the present disclosure provides a system for identifying primary field-specific entity records required by a user, wherein the system comprises:

a database arrangement operable to store a structured database;

a communication module operable to retrieve existing data sources from the database arrangement, wherein the communication module is operatively coupled to a processing module; and the processing module operable to:

receive the structured database having field-specific entity records, wherein the field specific entity records are obtained by segmenting entity records in one or more field segments, and each of the entity records comprises an entity name and plurality of entity attributes;

identify at least one pair of field-specific entity records having at least one similar entity attribute in each of the one or more field segments;

designate relations between the identified at least one pair of field-specific entity records;

determine a weightage score of each of the relations between the at least one pair of field-specific entity records;

determine an importance score of each of the field-specific entity records based on the plurality of entity attributes of the field-specific entity record and relations of the field-specific entity record;

receive a first user-input based on a field specified by the user, wherein the primary field-specific entity records required by the user are identified from a field segment associated with the specified field; and identify the primary field-specific entity records based on the determined weightage scores and the determined importance scores of the field-specific entity records in the field segment associated with the specified field.

The present disclosure provides an optimal method and system for managing primary field-specific entity records. Furthermore, the method segments a large amount of data records from the existing data sources to an easily manageable set of entity records. Moreover, the described method enables extraction of current data related to primary field-specific entity records from various public and available internal sources of research work, social networking sites, blogs, news, institutes, government agencies, market surveys and so forth. Furthermore, the described method provides a robust and flexible way of identifying primary field-specific entity records from segmented data records. Moreover, the method further identifies the relationship between at least one of the primary field-specific entity record. Additionally, strength of the relationship is being determined which further helps in identifying the primary field-specific entity record. However, the method described herein does not require human intervention for functioning. Therefore, reduces chances for the misleading results due to out-dated results. Furthermore, the system described herein is simple and inexpensive.

Throughout the present disclosure, the term "entity" relates to one or more persons, organizations, objects, domains and so forth. For example, entity may include a researcher, marketing influential, physician and so forth. Furthermore, expertise of the entity may be required for various purposes in an industry. For example, the expertise may be required for launching or promoting a new service or product. Moreover, the entities may play a key role in providing such expertise. Furthermore, it may be beneficial to acquire such expertise from a primary field-specific entity. Specifically, the primary field-specific entity may refer to an entity that may be an expert in domain of the industry required by a user. Furthermore, there may be multiple primary field-specific entities present related to the specific domain required by the user. Moreover, a structured database containing information related to the various primary field-specific entities related to the specific domain required by the user may be required. Furthermore, the structured database may be developed to store the information related to the various primary field-specific entities in an organized manner.

Throughout the present disclosure, the term "database arrangement" as used herein relates to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the data storage and systems may include MongoDB, HBase, ElasticSearch, Neo4J, ArangoDB and so forth. Additionally, the database arrangement refers to the software program for creating and managing one or more databases. Optionally, the database arrangement may be operable to supports relational operations, regardless of whether it enforces strict adherence to the relational model, as understood by those of ordinary skill in the art.

Throughout the present disclosure, the term "communication module" relates to an arrangement of interconnected programmable and/or non-programmable components that are configured to facilitate data communication between one or more electronic devices, software modules and/or databases, whether available or known at the time of filing or as later developed. Additionally, the communication module includes wired or wireless communication that can be carried out via any number of known protocols. The communication module is operable to access the existing data sources and communicate the accessed data to the processing module.

Throughout the present disclosure, the term "processing module" used herein relates to a computational element that is operable to respond to and process instructions that carry out the method. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing module" may refer to one or more individual processors, processing devices and various elements associated with a processing device that may be shared by other processing devices. Additionally, the one or more individual processors, processing devices and elements are arranged in various architectures for responding to and processing the instructions that drive the system. Beneficially, the processing module is operatively coupled to the communication module. Consequently, the coupling of processing module and communication module enables an exchange of data between the database arrangement and the processing module.

Throughout the present disclosure, the term "entity records" relates to information retrieved by structuring the data-records from the existing data sources. Furthermore, the entity records comprise entity names and plurality of entity attributes associated with the entity names. Specifically, the term "entity name" and "plurality of entity attributes" relate to subject of information included in the entity records. Specifically, the entity record includes information related to the entity name. Furthermore, the entity names may belong to one or more persons, organizations, objects, domains and so forth. Moreover, the entity records include fields of information about the entity names. Specifically, the fields of information about the entity names are the plurality of entity attributes. Additionally, the plurality of entity attributes may include data related to the further information about the achievements of entity in its domain. For example, the plurality of entity attributes may include information regarding correspondence address, academic background, birthdate, research work, publications and so forth. Furthermore, the existing data records may be structured to obtain the entity records. Optionally, the entity records may be in tabular form. Additionally, first cell in a column may include the entity name and remaining cells in the column may include the plurality of entity attributes. Specifically, the entity records of the primary field-specific entities include the entity names and the plurality of entity attributes related to the entity and thereby discarding information pertaining to some other similar entity name in the database arrangement. Furthermore, the plurality of the entity attributes may be similar for different entity records. In an example, a first entity record with an entity name "John" may comprise information such as name of the institute from where the entity has acquired education, publication details, research work, and correspondence address. Additionally, a second entity record with an entity name "Jessica" may comprise information such as name of the institute from where the entity has acquired education, publication details, research work, correspondence address, and birthdate as entity attributes.

As mentioned previously, the method comprises providing the structured database having field-specific entity records, wherein the field specific entity records are obtained by segmenting entity records in one or more field segments, and each of the entity records comprises an entity name and plurality of entity attributes. The processing module is operable to receive the structured database stored in the database arrangement.

Throughout the present disclosure, the term "existing data sources" relates to organized or unorganized bodies of digital information regardless of manner in which data is represented therein. Furthermore, the existing data sources may be made available from public or available internal sources. For example, the existing data sources may include information from social networking sites, blogs, news, institutes, government agencies, market surveys and so forth.

Throughout the present disclosure, the term "data-records" refers to the information related to the entities. Furthermore, the information in the data-records may include data in form of tables, maps, grids, packets, files, documents, lists or in any other form. However, the information may be included in multiple, scattered data-records. For example, the existing data sources may comprise information about a person with the name "John Lewis". Specifically, a first data-record with an entity name "John Lewis" may comprise information such as name of the institute from where the entity has acquired education, and birthdate. Additionally, a second data-record with an entity name "John Lewis" may comprise information such as birthdate and correspondence address. Furthermore, the existing data sources may include more than one data records for "John Lewis" that may be related to another person. Specifically, the data-records may have scattered, repetitive, inconsistent and/or missing values. Therefore, the data-records may be further processed in order to obtain data records pertaining to the entity name of such persons. Moreover, the existing data sources may be crawled from an available public or internal source to extract data-records. Furthermore, the public or internal sources may include social networking sites, blogs, news, institutes, government agencies, market surveys and so forth.

In an embodiment, the method comprises developing the structured database by crawling existing data sources to extract data-records. Moreover, the entity records are obtained by processing (namely, refining) the data records. Furthermore, the system comprises a database arrangement. Moreover, the database arrangement is operable to store the existing data sources and structured database. Moreover, a communication module is operably to retrieve existing data sources from the database arrangement. Additionally, the communication module is operatively coupled to a processing module. Moreover, the processing module is operable to extract data-records from the existing data sources. Furthermore, the processing module is operable to develop the structured database from the existing data sources.

Optionally, the method comprises developing the structured database by crawling the existing data sources to extract data-records. Specifically, the processing module is operable to crawl the existing data sources to extract data-records. Furthermore, crawling the existing data sources may include extracting data from the available public or internal sources. Moreover, the available public sources may include information from profile made on social networking sites, blogs, news, institutes, market surveys and so forth. Furthermore, the crawled existing data sources may include information based on the research work or the publication data made available on the networking sites or several internal sources. Moreover such data may also include information from the institute or company websites. Furthermore, the extracted data-records are structured to obtain entity records. Moreover, the processing module is operable to structure the extracted data-records to obtain entity records. Moreover, the data records crawled from the existing data sources may be scattered. Therefore, it may be beneficial to develop a structured database comprising entity records. Furthermore, the structured database may include all the data records crawled from the existing data sources in an organized manner in the format of entity records. Furthermore, developing the structured database further comprises tagging the plurality of entity attributes with at least one class. Optionally, the processing module is operable to tag the plurality of entity attributes with at least one class. The term "class" relates to a category that one or more entity attributes may be assigned in. Examples of the class may include, but are not limited to, birthdate, research papers, correspondence address, academic background. Specifically, an entity attribute with data about a date of birth of an entity may be tagged with the class "birthdate". More specifically, an entity attribute with data about institute of graduation of the entity may be tagged with the class "academic background". Additionally, each of plurality of entity attributes is tagged with at least one class. Furthermore, at least one tagged class with an entity attribute may provide information about the type of data included in the entity attribute.

Optionally, developing the structured database further comprises identifying a field of each of the entity records based on at least one of the plurality of entity attributes of the entity record. More optionally the processing module is operable to identify the field of each of the entity records based on at least one of the plurality of entity attributes of the entity record. Specifically, the term "field" refers to a domain or an area of expertise of the entity records. For example, the field of the primary field-specific entity record may include medicine, oncology, pediatrics and so forth. Furthermore, the field of the entity record may be identified based on the at least one of the plurality of entity attributes of the entity record. In an example, an entity may comprise entity attributes comprising information about institute of graduation of the entity and a current organization of work of the entity. In such example, the entity attribute comprising information about institute of graduation of the entity may be "Stanford University, Department of Oncology", and the entity attribute comprising information about current organization of work of the entity may be "Centre for Cancer Research, National Cancer Institute". Therefore in such example, the field of the entity may be identified as "oncology" from the entity attributes of the entity record. Moreover, the entity records are segmented into one or more field segments based on the field of the entity records, to identify field-specific entity records. Furthermore, the processing module is operable to segment the entity records into one or more field segments. Specifically, entity records identified in a specific field may be segmented into a corresponding field segments. Therefore, entity records in a field segment may have a similar field and may be referred to as "field-specific entity records".

The method for managing primary field-specific entity records required by the user comprises identifying at least one pair of field-specific entity records having at least one similar entity attribute in each of the one or more field segments. Furthermore, the processing module is operable to identify at least one pair of field-specific entity records having at least one similar entity attribute in each of the one or more field segments. Moreover, the at least one pair of field-specific entity records may be within the field segment. Additionally, the at least one pair of field-specific entity records may be identified between a pair of field specific entity records in two discrete field segments. Furthermore, a pair of field-specific entity records may be identified based on at least one similar entity attribute therebetween. Specifically, a pair of entities having a common institute of work may have a similar entity attribute in the pair of entity records thereof. Therefore, such at least one pair of entity records may be identified based on at least one similar attribute. In an example, the structured database may comprise a first entity record with an entity name "John" and a second entity record with an entity name "Jessica". In such example, entities John and Jessica may have co-authored a research publication. Therefore, first entity record for "John" and second entity record for "Jessica" may comprise data associated with the research publication as entity attributes therein. Subsequently in such example, the first and the second entity record may be identified as a pair based on the similar entity attribute of the research publication.

The method for managing primary field-specific entity records required by the user comprises further comprises designating relations between the identified at least one pair of field-specific entity records. Furthermore, the processing module is operable to designate relations between the identified at least one pair of field-specific entity records. Specifically, the term "relation" refers to association between the at least one pair of field-specific entity records. Furthermore, the relation between the identified at least one pair of field-specific entity records may include number of publications co-authored, co-inventors, colleagues, classmates and so forth. In aforementioned example, a relation may be designated between the identified pair of first entity record "John" and second entity record "Jessica".

The method further comprises determining a weightage score of each of the relations between the at least one pair of field-specific entity records. Furthermore, the processing module is operable to determine the weightage score of each of the relations between the at least one pair of field-specific entity records. Specifically, weightage score relates to a strength of the relation between the at least one pair of field-specific entity records. Furthermore, the weightage score of each of the relations between the at least one pair of field-specific entity records is determined. Specifically, the strength of a relation between the field-specific entity records may be determined by a number of publications co-authored, number of research work or inventions co-assisted and so forth. More specifically, a higher number of publication co-authored, projects associated with the pair of entity records may provide a higher weightage score. Furthermore, a higher number of similar entity attributes between the pair of fields-specific entity records may provide a higher weightage score. In the aforementioned example, the weightage score is determined for the relation between the first data-record with the entity name "John" and the second data-record with the entity name "Jessica" based on the number of publications co-authored.

The method further comprises determining an importance score of each of the field-specific entity records based on the plurality of entity attributes of the field-specific entity record and relations of the field-specific entity record. Moreover, the processing module is operable to determine the importance score of each of the field-specific entity records based on the plurality of entity attributes of the field-specific entity record and relations of the field-specific entity record. Specifically, importance score relates to an individual score of the each of the field-specific entity records in the particular field of the user's interest. Furthermore, the importance score of each of the field-specific entity records may be determined based on the plurality of entity attributes of the field-specific entity record and relations of the field-specific entity record. Specifically, importance score of a field-specific entity records may be determined based on the plurality of entity attributes of the field-specific entity record. More specifically, plurality of entity attributes may be analysed to determine a significance thereof. Therefore, such significance of the plurality of entity attributes may influence the importance score. Furthermore, importance score of a field-specific entity records may be determined based relations of the field-specific entity record. Specifically, a weightage score of relations between a field-specific entity record and the remaining field-specific entity records may influence the importance score of the field-specific entity record. In the aforementioned example, the importance score of the first entity record with the entity name "John" and the second entity record with the entity name "Jessica" is determined separately.

In an embodiment, determining the importance score of each of the field-specific entity records comprises determining an attribute-specific importance score for each of the plurality of entity attributes of a field-specific entity record.

Optionally, the processing module is operable to determine the attribute-specific importance score for each of the plurality of entity attributes of a field-specific entity record. Furthermore, attribute-specific importance scores may include scores related to each of the plurality of entity attributes. Specifically, each of the plurality of entity attributes may be analysed to determine the attribute-specific importance score thereof. More specifically, attribute-specific importance score of an entity attribute may be determined based on a significance of the entity attribute. Furthermore, entity attributes such as birthdate, correspondence address, email address and so forth may have a significantly low attribute-specific importance score. Alternatively, optionally, attribute-specific importance score may not be determined for such entity attributes. Moreover, entity attributes such as academic background, field of work, institute of work may have a high attribute-specific importance score. Alternatively, optionally, attribute-specific importance score may be determined for solely for such entity attributes. Furthermore, entity attribute with information about a top-tier college as the academic background may have a higher attribute-specific importance score in comparison with an entity attribute with information about a second-tier college as the academic background.

In an embodiment, determining the importance score of each of the field-specific entity records comprises determining a number of relations designated between the field-specific entity record and remaining field-specific entity records. Optionally, the processing module is operable to determine a number of relations designated between the field-specific entity record and remaining field-specific entity records. Specifically, the number of relations of a particular field-specific entity record with the remaining field-specific entity records is determined. It will be appreciated that a field-specific entity record with a higher number of relations with the remaining field-specific entity records may have a higher importance in comparison with a field-specific entity record with a lower number of relations.

In an embodiment, the number of designated relations, weightage score of the designated relations of the field-specific entity record and the determined attribute-specific importance scores are aggregated to determine the importance score of the field-specific entity record. Optionally, the processing module is operable to aggregate the number of designated relations, weightage score of the designated relations of the field-specific entity record and the determined attribute-specific importance scores. Specifically, the importance score determined by such aggregation may provide an accurate estimation related to the importance of the field-specific entity record As mentioned previously, the method further comprises receiving a first user-input based on a field specified by the user, wherein the primary field-specific entity records required by the user are identified from a field segment associated with the specified field. Furthermore, the processing module is operable to receive the first user-input based on a field specified by the user, wherein the primary field-specific entity records required by the user are identified from a field segment associated with the specified field. Specifically, the first user-input is based on identified fields of the entity records. More specifically, the processing module may compile the identified fields in a list. Consequently, such list of fields may be presented to the user and the user may provide the first user-input as a selection of a field from the list of fields. Subsequently, the primary field-specific entity records required by the user are identified from such selected field.

Furthermore, the primary field-specific entity records may be identified based on the determined weightage scores and importance scores of the field-specific entity records in the field segment associated with the specified field. Moreover, the processing module is operable to identify the primary field-specific entity records based on the determined weightage scores and the determined importance scores of the field-specific entity records in the field segment associated with the specified field. Specifically, importance scores and weightage score of field-specific entity records in a field segment are compared to determine the primary field-specific entity records in the field segment associated with the field specified by the user. More specifically, the field-specific entity record with higher importance scores and weightage scores may be identified as the primary field-specific entity records. Furthermore, the user may specify the number of primary field-specific entity records required thereby. In an example, the user may specify a requirement of twenty-five primary field-specific entity records from the field "oncology".

In an example, first, second, third and fourth entity records with entity names "A", "B", "C", "D" respectively may comprise information such as name of the institute from where the entities have acquired education, publication details, research work, and correspondence address associated with the entities. Furthermore, entity records are arranged in the structured database stored in the database arrangement. Moreover, the plurality of entity attributes for each of the entity record is tagged with at least one class. Furthermore, the class includes educational institute, publication, research work and correspondence address. Additionally, the entity records are segmented into the field-specific entity records. Moreover, the first entity record "A" and the third entity record "C" may be associated with a first field. Additionally, the second entity record "B" and the fourth entity record "D" may be associated with a second field. However, the first user-input related to the second field is received. Therefore, the data associated with the second entity record "B" and the fourth entity record "D" will be extracted. Moreover, the relations between the identified pair of field-specific entity records are designated. Furthermore, the weightage score is determined for each of the identified relations.

In an embodiment, the method further comprises identifying class-specific primary field-specific entity records based on a second user-input. Optionally, the processing module is further operable to identify class-specific primary field-specific entity records based on the second user-input. Furthermore, the second user-input received from the user is associated with at least one class of the plurality of entity attributes of the entity records. Specifically, the user may require class-specific primary field-specific entity records. More specifically, the field-specific entity records in a field (as specified in the first user-input) may be classified based on the at least one class (as specified by the second user-input) and the class-specific primary field-specific entity records may be obtained from the classified field-specific entity records. In an example, the first user-input may be the field "oncology". Subsequently in such example, the second user input may be based on the class "Research Publications". Therefore in such example, the class-specific primary entity records are extracted from the field segment associated with the field "oncology", wherein the field-specific entity records with a higher number of entity attributes in the class "Research Publications" may be identified as the class-specific primary field-specific entity records.

In an embodiment, identifying class-specific primary field-specific entity records based on the second user-input comprises receiving the second user-input based on the at least one class of the plurality of entity attributes of the tagged entity records. Optionally, the processing module is operable to receive the second user-input based on the at least one class of the plurality of entity attributes of the tagged entity records. Specifically, the class-specific primary field-specific entity records obtained may be determined based on the at least one class specified by the user.

In an embodiment, identifying class-specific primary field-specific entity records based on the second user-input comprises obtaining class-specific importance scores of each of the at least one class of tagged entity attributes of the field-specific entity record by aggregating the attribute-specific importance scores of entity attributes in the at least one class. Optionally, the processing module is operable to obtain the class-specific importance scores of each of the at least one class of tagged entity attributes of the field-specific entity record by aggregating the attribute-specific importance scores of entity attributes in the at least one class. Specifically, attribute-specific importance score of the entity attributes in at least one class specified by the user may be aggregated for each of the field-specific entity record. It will be appreciated that an entity record with a high class-specific importance score for entity attributes in the class specified by the user may be identified as the primary class-specific primary field-specific entity records. Optionally, the class-specific primary field-specific entity records are identified based on the obtained class-specific importance score of the at least one class of the plurality of entity attributes.

Furthermore, there is disclosed a computer readable medium containing program instructions for execution on a computer system, which when executed by a computer, cause the computer to perform method steps for g managing primary field-specific entity records required by a user, the method comprising the steps of providing a structured database having field-specific entity records, wherein the field specific entity records are obtained by segmenting entity records in one or more field segments, and each of the entity records comprises an entity name and plurality of entity attributes; identifying at least one pair of field-specific entity records having at least one similar entity attribute in each of the one or more field segments; designating relations between the identified at least one pair of field-specific entity records; determining a weightage score of each of the relations between the at least one pair of field-specific entity records; determining an importance score of each of the field-specific entity records based on the plurality of entity attributes of the field-specific entity record and relations of the field-specific entity record; receiving a first user-input based on a field specified by the user, wherein the primary field-specific entity records required by the user are identified from a field segment associated with the specified field; and identifying the primary field-specific entity records based on the determined weightage scores and the determined importance scores of the field-specific entity records in the field segment associated with the specified field.

Optionally, the computer medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1:
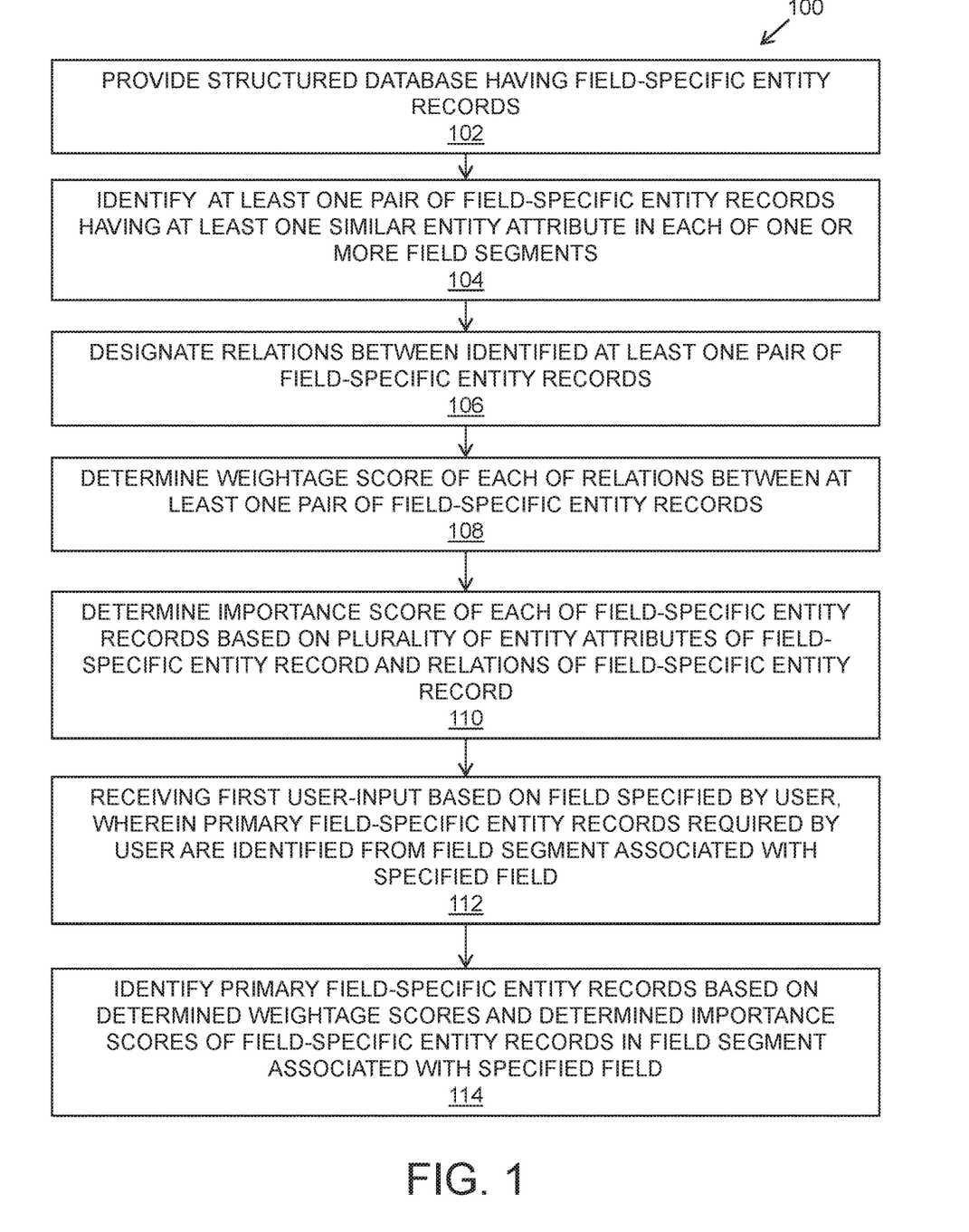
FIG. 1 illustrates steps of a method of managing primary field-specific entity records required by a user, in accordance with an embodiment of the present disclosure.

Referring to FIG. 1, illustrated are steps of a method 100 of managing primary field-specific entity records required by a user, in accordance with an embodiment of the present disclosure. At a step 102, a structured database is provided. The field specific entity records are obtained by segmenting entity records in one or more field segments, and each of the entity records comprises an entity name and plurality of entity attributes. At a step 104, at least one pair of field-specific entity records having at least one similar entity attribute is identified in each of the one or more field segments. At a step 106, relations between the identified at least one pair of field-specific entity records are designated. At a step 108, a weightage score of each of the relations between the at least one pair of field-specific entity records is determined. At a step 110, an importance score of each of the field-specific entity records is determined based on the plurality of entity attributes of the field-specific entity record and relations of the field-specific entity record. At a step 112, a first user-input is received based on a field specified by the user, wherein the primary field-specific entity records required by the user are identified from a field segment associated with the specified field. At a step 114, the primary field-specific entity records are identified based on the determined weightage scores and the determined importance scores of the field-specific entity records in the field segment associated with the specified field.

The steps 102 to 114 are only illustrative and other alternatives can also be provided where one or more steps are added, one or more steps are removed, or one or more steps are provided in a different sequence without departing from the scope of the claims herein.

Figure 2:
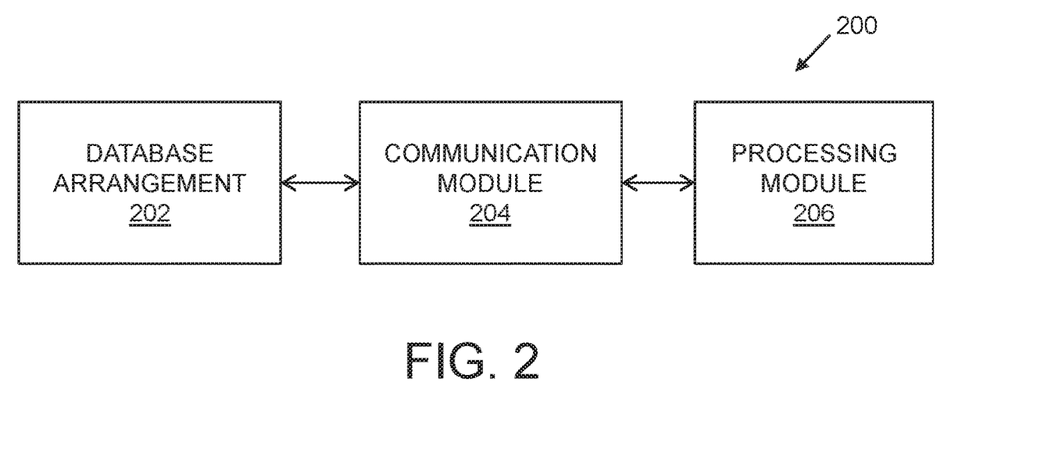
FIG. 2 is a block diagram of a system for managing primary field-specific entity records required by the user, in accordance with an embodiment of the present disclosure.

Referring to FIG. 2, there is shown a block diagram of a system 200 for managing primary field-specific entity records, in accordance with an embodiment of the present disclosure. The system 200 comprises a database arrangement 202 operable to store a structured database. Furthermore, the system 200 comprises a communication module 204. The communication module 204 is operatively coupled to a processing module 206. Optionally, the processing module 206 is operable to develop the structured database from the existing data sources. More optionally, the processing module 206 is operable to extract entity records from the existing data sources, wherein the data records comprise entity names and entity attributes associated with the entity names. Specifically, the processing module 206 is operable to identify class-specific primary field-specific entity records based on a user-input. Furthermore, the processing module 206 is operable to determine the importance score of each of the field-specific entity records.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for managing primary field-specific entity records required by a user, wherein the method comprises:
providing a structured database having field-specific entity records, wherein the field specific entity records are obtained by segmenting entity records in one or more field segments, and each of the entity records comprises an entity name and plurality of entity attributes;

identifying at least one pair of field-specific entity records having at least one similar entity attribute in each of the one or more field segments;

designating relations between the identified at least one pair of field-specific entity records;

determining a weightage score of each of the relations between the at least one pair of field-specific entity records;

determining an importance score of each of the field-specific entity records based on the plurality of entity attributes of the field-specific entity record and relations of the field-specific entity record;

receiving a first user-input based on a field specified by the user, wherein the primary field-specific entity records required by the user are identified from a field segment associated with the specified field; and identifying the primary field-specific entity records based on the determined weightage scores and the determined importance scores of the field-specific entity records in the field segment associated with the specified field.

2. The method of claim 1, wherein the method further comprises developing the structured database by:

crawling existing data sources to extract data-records;

structuring the extracted data-records to obtain entity records, wherein each of the entity records comprises an entity name and plurality of entity attributes;

tagging the plurality of entity attributes with at least one class;

identifying a field of each of the entity records based on at least one of the plurality of entity attributes of the entity record; and segmenting the entity records into one or more field segments based on the field of the entity records, to identify field-specific entity records.

3. The method of claim 2, wherein the method further comprises identifying class-specific primary field-specific entity records based on a second user-input, wherein the second user-input received from the user is associated with at least one class of the plurality of entity attributes of the entity records.

4. The method of claim 3, wherein identifying class-specific primary field-specific entity records based on the second user-input comprises:

receiving the second user-input based on the at least one class of the plurality of entity attributes of the tagged entity records;

determining an attribute-specific importance score for each of the plurality of entity attributes of a field-specific entity record;

obtaining class-specific importance scores of each of the at least one class of tagged entity attributes of the field-specific entity record by aggregating the attribute-specific importance scores of entity attributes in the at least one class; and identifying the class-specific primary field-specific entity records based on the obtained class-specific importance score of the at least one class of the plurality of entity attributes.

5. The method of claim 2, wherein determining the importance score of each of the field-specific entity records comprises:

determining an attribute-specific importance score for each of the plurality of entity attributes of a field-specific entity record;

determining a number of relations designated between the field-specific entity record and remaining field-specific entity records; and aggregating the number of designated relations, weightage score of the designated relations of the field-specific entity record and the determined attribute-specific importance scores to determine the importance score of the field-specific entity record.

6. A system for identifying primary field-specific entity records required by a user, wherein the system comprises:

a database arrangement operable to store a structured database;

a communication module operable to retrieve existing data sources from the database arrangement, wherein the communication module is operatively coupled to a processing module; and the processing module operable to:

receive the structured database having field-specific entity records, wherein the field specific entity records are obtained by segmenting entity records in one or more field segments, and each of the entity records comprises an entity name and plurality of entity attributes;

identify at least one pair of field-specific entity records having at least one similar entity attribute in each of the one or more field segments;

designate relations between the identified at least one pair of field-specific entity records;

determine a weightage score of each of the relations between the at least one pair of field-specific entity records;

determine an importance score of each of the field-specific entity records based on the plurality of entity attributes of the field-specific entity record and relations of the field-specific entity record;

receive a first user-input based on a field specified by the user, wherein the primary field-specific entity records required by the user are identified from a field segment associated with the specified field; and identify the primary field-specific entity records based on the determined weightage scores and the determined importance scores of the field-specific entity records in the field segment associated with the specified field.

7. The system of claim 6, wherein the structured database is developed by:

crawling existing data sources to extract data-records;

structuring the extracted data-records to obtain entity records, wherein each of the entity records comprises an entity name and plurality of entity attributes;

tagging the plurality of entity attributes with at least one class;

identifying a field of each of the entity records based on at least one of the plurality of entity attributes of the entity record; and segmenting the entity records into one or more field segments based on the field of the entity records, to identify field-specific entity records.

8. The system of claim 7, wherein the processing module is further operable to identify class-specific primary field-specific entity records based on a second user-input, wherein the second user-input received from the user is associated with at least one class of the plurality of entity attributes of the entity records.

9. The system of claim 7, wherein the processing module is operable to determine the importance score of each of the field-specific entity records by:

determining an attribute-specific importance score for each of the plurality of entity attributes of a field-specific entity record;

determining a number of relations designated between the field-specific entity record and remaining field-specific entity records; and aggregating the number of designated relations, weightage score of the designated relations of the field-specific entity record and the determined attribute-specific importance scores to determine the importance score of the field-specific entity record.

10. The system of claim 8, wherein the processing module is operable to identify class-specific primary field-specific entity records based on the second user-input by:

receiving the second user-input based on the at least one class of the plurality of entity attributes of the tagged entity records;

determining an attribute-specific importance score for each of the plurality of entity attributes of a field-specific entity record;

obtaining class-specific importance scores of each of the at least one class of tagged entity attributes of the field-specific entity record by aggregating the attribute-specific importance scores of entity attributes in a class; and identifying the class-specific primary field-specific entity records based on the obtained class-specific importance score of the at least one class of the plurality of entity attributes.

11. A computer readable medium containing program instructions for execution on a computer system, which when executed by a computer, cause the computer to perform method steps for g managing primary field-specific entity records required by a user, the method comprising the steps of:

providing a structured database having field-specific entity records, wherein the field specific entity records are obtained by segmenting entity records in one or more field segments, and each of the entity records comprises an entity name and plurality of entity attributes;

identifying at least one pair of field-specific entity records having at least one similar entity attribute in each of the one or more field segments;

designating relations between the identified at least one pair of field-specific entity records;

determining a weightage score of each of the relations between the at least one pair of field-specific entity records;

determining an importance score of each of the field-specific entity records based on the plurality of entity attributes of the field-specific entity record and relations of the field-specific entity record;

receiving a first user-input based on a field specified by the user, wherein the primary field-specific entity records required by the user are identified from a field segment associated with the specified field; and identifying the primary field-specific entity records based on the determined weightage scores and the determined importance scores of the field-specific entity records in the field segment associated with the specified field.

\* \* \* \* \*